United States Patent [19]

Schmid

[11] Patent Number: 4,734,937
[45] Date of Patent: Mar. 29, 1988

[54] TELEPHONE INSTALLATION

[75] Inventor: Eberhard Schmid, Poing, Fed. Rep. of Germany

[73] Assignee: Siemens Aktiengesellschaft, Berlin and Munich, Fed. Rep. of Germany

[21] Appl. No.: 928,603

[22] Filed: Nov. 3, 1986

Related U.S. Application Data

[63] Continuation of Ser. No. 765,554, Aug. 12, 1985, abandoned, which is a continuation of Ser. No. 540,198, Oct. 7, 1983, abandoned.

[30] Foreign Application Priority Data

Oct. 11, 1982 [DE] Fed. Rep. of Germany ....... 3237652

[51] Int. Cl.$^4$ .............................................. H04M 19/02
[52] U.S. Cl. .................................. 379/253; 379/324; 379/413
[58] Field of Search ............... 379/399, 412, 413, 402, 379/418, 387, 322, 324, 345, 405, 253, 251, 418, 252; 363/21, 97

[56] References Cited

U.S. PATENT DOCUMENTS

| | | | |
|---|---|---|---|
| 4,037,065 | 7/1977 | Nahay | 379/405 |
| 4,133,986 | 1/1979 | Picandet et al. | 379/405 |
| 4,319,093 | 3/1982 | Bars | 379/324 |
| 4,322,586 | 3/1982 | Mein et al. | 379/377 |
| 4,402,039 | 8/1983 | Jirka | 379/377 X |
| 4,484,032 | 11/1984 | Rosenbaum | 379/345 |
| 4,598,173 | 7/1986 | Chea, Jr. et al. | 379/413 X |

OTHER PUBLICATIONS

Proceedings of the JEEE, Vol. 68, No. 8, August 1980, Pg. 991-1008.

Primary Examiner—Jin F. Ng
Assistant Examiner—R. Vaas
Attorney, Agent, or Firm—Herbert A. Lerner; Laurence A. Greenberg

[57] ABSTRACT

The invention relates to an overvoltage protected high-voltage integrated circuit and a low-voltage integrated circuit with switching control for a hybrid circuit connected peripherally to a telephone exchange for serving telephone instruments. In particular it serves to provide battery feed, ringing voltage generation, and voice signal transmission. Essentially the circuit includes a transformer for transmission of high-frequency energy to the high-voltage circuit, which incorporates transfer of signal currents through four high-resistance, pair-organized symmetrical voltage dividers. The circuit further includes a ringing signal generating arrangement that is activated by means of a voltage increase applied to the high-voltage circuit supply voltage.

13 Claims, 3 Drawing Figures

TELEPHONE INSTALLATION

This application is a continuation of application Ser. No. 765,554, filed Aug. 12, 1985, now abandoned, which is a continuation of application Ser. No. 540,198, filed Oct. 7, 1983, now abandoned.

The present invention relates to a telephone installation formed of a number of peripheral telephones and an exchange or central station shared by them, which contains a first section that serves for current supply to the individual telephones upon their activation by a user and a second section that serves for relaying signals between the individual telephones and possibly to an additional telephone installation, wherein each of the peripheral telephones has a circuit section assigned to it in the exchange or central station which is connected by two terminals to each respective telephone, a first pair of wires applied to the two terminals for addressing the respective telephone through the exchange or central station and a second pair of wires for addressing the exchange or central station through the respective peripheral telephone.

Such configurations for telephone installations are generally in use. Obviously, the first pair of wires serves for supplying the voice signals to be sent from the central station to the individual telephone and to be supplied by other telephones through the central station, as well as for the ringing signals and for current supply to the respective telephones. The second pair of wires serves for controlling the central station and for picking up the dialing signals or voice signals supplied by the respective telephone.

Since in general there are considerable distances between the central station and the peripheral telephones to be overcome by means of appropriate cables, there is also a considerable danger of operational disturbances caused by external factors. An especially likely occurrence in these so-called subscriber lines is that symmetrical interference voltages, so-called longitudinal voltages (common mode signals) are continuously induced from adjacent power lines and overhead lines for electric railroads, etc. In telephone installations normal voice transmission between the individual telephones and the central station generally suffers no appreciable impairment by these longitudinal voltages provided they do not exceed an upper limit of e.g. 65 $V_{rms}$. Other sources of interferences may be thunderstorms, that is, lightning, which may put a load on the subscriber lines through additional overvoltages. Appropriate construction of a primary overvoltage protection provision generally ensures that the residual short-time load from overvoltage occuring in such a case does not exceed the value 1.5 kV, resulting only in a disturbance of the voice signals but not in further damage. Furthermore, in the case of long-lasting shortcircuits between a telephone line and a power line, means must also be taken to ensure that there can be no breakdown of the vital parts of the central station, even if peripheral components are destroyed. An inherent protective device which has long been in use is a differential transformer used for voice transmission and for two-wire/four wire conversion. In this manner, a d-c separation between the subscriber lines (that is, the connections leading to the individual peripheral telephones) and the switching system in the central station, can be achieved.

By the introduction of digital switching systems (see, for instance Proceedings of the IEEE, Vol. 68, No. 8, August 1980, p. 991-1008), it is attempted to replace the bulky and expensive differential transformers with electronic integrated components, which simultaneously take over the functions of "battery feed" and "ringing". However, the integrated circuits available heretofore require special protective devices against the occurrence of overvoltages for each connection, (that is, for each peripheral telephone) because of the dc separation which is then missing. Such protective measures may include the use of protective resistors and diode bridges. All of these measures have the disadvantage that their protective resistors consume power permanently and that moreover, in case of high external additional loads such as lightning bolts, current surges of up to 50 A can enter into the installation serving as the current supply of the peripheral telephones, that is, into the so-called exchange or central station battery.

The task of continuously controlling the induced longitudinal voltages occurring during operation requires a considerable cost in electronic circuitry, as experience has shown. It should be noted in this regard that the electronic power supply circuit used in the devices available heretofore must react to the longitudinal voltages with symmetrical equalizing currents of up to 50 mA, so that these components will collapse at the subscriber-end terminal.

It is accordingly an object of the invention to provide a telephone installation, which overcomes the hereinafore-mentioned disadvantages of the heretofore-known devices of this general type, and which offers other advantages to be set forth in greater detail below.

With the foregoing and other objects in view there is provided, in accordance with the invention, a telephone installation, comprising:

a plurality of peripheral telephones, wherein two telephone terminals are connected to each respective telephone;

an exchange or central station shared by the telephones, which include a first circuit section for supplying current to the telephones upon activation by a user, and a second circuit section for relaying signals between the telephones and possibly to an additional installation; and further a pair of identical circuit sections for transmitting signals to be relayed from the switching station in the central station to each respective telephone, wherein each of the circuit sections include including its own controllable voltage source with a mutually inverted terminal connected to and controlled by the exchange and to ground, two first voltage dividers each having first and second resistors and a tap disposed therebetween, each of the first resistors being connected in series with a respective one of the controllable voltage sources, and the second resistors having leads being directly connected to each other, a common first differential amplifier having two inputs and two outputs, each of the inputs being connected to a respective one of the taps of the first voltage dividers in pairs, two current sources for generating voice currents in direction toward the respective telephone, each of the current sources having a control terminal connected to a respective one of the outputs of the first differential amplifier and each having an input and an output, and two identical resistors each shunting the input and output of a respective one of the current sources, wherein one of the identical resistors is connected between one of the telephone terminals and the leads of the second resistors of the first voltage dividers, and the other of the identical resistors is connected to the other of the telephone terminals further including:

a switching regulator having an input connected to the exchange and a control output;

a transformer for supplying current to the respective telephone along with the current sources, wherein the transformer has a primary side connected to the control output of the switching regulator, and a secondary side;

a rectifier circuit connected to the secondary side of the transformer and to the identical resistors for driving the telephone terminals with opposite polarity;

a pair of conductors for controlling the switching regulator and the central station based on the voltage state at the telephone terminals and for transmitting signals from the respective telephone, wherein the conductors each include an identical second voltage divider having a first resistor connected to a respective one of the telephone terminals, a second resistor connected to reference potential or ground and a tap disposed therebetween, and a second common differential amplifier having a respective input connected to each of the taps of the second voltage dividers and an output connected to the central station.

In accordance with another feature of the invention, there is provided a bipolar transistor operated in a common emitter circuit, wherein the transistor is connected between the control output of the switching regulator and the primary side of the transformer.

In accordance with a further feature of the invention, the transistor is of the pnp type.

In accordance with an added feature of the invention, the two current sources, the identical resistors, the first differential amplifier, and the first and second resistors of the two first voltage dividers, are monolithically combined to form a high-voltage component.

In accordance with an additional feature of the invention, at least the first resistors of the second voltage dividers are also monolithically combined in the high-voltage component.

In accordance with a concomitant feature of the invention, there is provided a third amplifier having an input connected to the central station and a respective output connected to each of the controlled voltage sources, the switching regulator, the controllable voltage sources, the third amplifier, and the second common differential amplifier, which are monolithically combined to form a low-voltage component.

Other features which are considered as characteristic for the invention are set forth in the appended claims.

Although the invention is illustrated and described herein as embodied in a telephone installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

The essence of the invention is that switching regulators are included in the path of energy transmission from the exchange battery to the subscriber line in order to reduce power dissipation, and that a dc separation takes place by way of a transformer for energy transfer from the switching regulator toward the two terminals of the respective peripheral telephone. The mutual signal transmission, however, is dc coupled by high-resistance voltage dividers.

The generation of the sinusoidal ringing voltage (which may be 65 $V_{rms}$) by an integrated semiconductor circuit, requires this circuit to have been produced using a technology which assures voltage stability up to 130 V. In the interest of providing an economical manufacture, the functions for the respective peripheral telephone are divided, in the telephone installation of the invention, into two partial installations, each combined in a monolithically integrated component. The first IC component contains a high-voltage circuit and serves two lines leading to the respective peripheral telephone through the two terminals, A1, A2. The remaining circuit parts which serve for addressing the telephone with the exchange, or respectively, for addressing the exchange with the telephone, are combined in the second IC component as a low-voltage circuit, produced with the use of standard technology. It is advisable to only include those parts which are especially susceptible, with respect to their voltage stability, in the component for the high-voltage circuit. The low-voltage section controls the high-voltage circuit and contains those parts of the circuit section to be provided between the exchange and the individual telephone, which are not subjected to any special voltage load.

Based on the description of the invention given above, the energy is transmitted to the high-voltage or power component by means of the transformer. The voltage regulator forms part of the low-voltage IC component. In a preferred embodiment of the invention, it controls the primary current of the transformer, using a power transistor. The power transistor is chosen as a high-voltage switching transistor and is, for example, in the form of a discrete transistor.

Signal input and signal output at the high-voltage component occurs through two high-resistance balanced bridge circuits, so that the advantage of dc isolation in the transformer is nearly maintained. The existing signal attenuations can be readily compensated in the low-voltage component.

Figure 1:
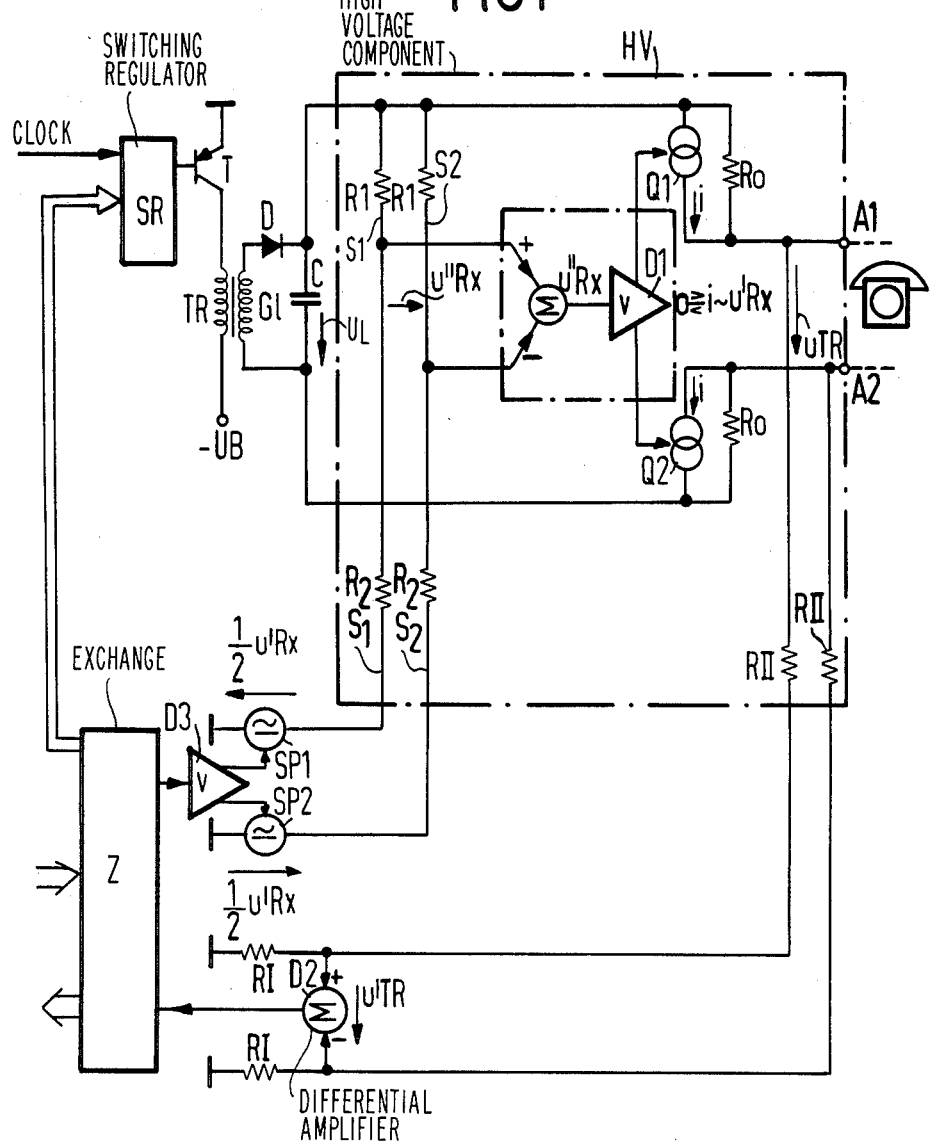
FIG. 1 is a simplified schematic circuit diagram of the telephone installation according to the invention.

Referring now to the figures of the drawings in detail and first, particularly, to FIG. 1 thereof, it is seen that a first terminal A1 for the first wire of the two-wire long-distance line to be connected to the peripheral telephone, is connected to one terminal of a resistor $R_o$ as well as to the output of a current source circuit Q1. The same is true of the second wire of the long-distance line leading to the telephone, in that a second terminal A2 is provided. The controllable current source provided for addressing the second terminal A2 is given reference symbol Q2, while the resistor in this case also has the reference symbol $R_o$. The two current sources Q1 and Q2 are each bridged or shunted by a respective one of the two identical resistors $R_o$. In addition, the terminal A1 and the terminal A2 are each connected through the respective resistor $R_o$ associated therewith, to an output terminal of a rectifier circuit G1, which in turn is addressed by a transformer TR. Furthermore, the terminal A1 (unlike the terminal A2) is connected through the resistor $R_o$ associated therewith, to one end of each of two identical voltage dividers S1, S2.

Two additional voltage dividers, which are also identical, are each formed by a series connection of a first resistor $R_I$ connected to reference potential (ground) and a second resistor $R_{II}$. These voltage dividers represent respective paths from the terminal A1 and the terminal A2 to an exchange or central station Z, since on one hand each ungrounded resistor $R_{II}$ of the voltage dividers is coupled with the respective terminal A1, A2 leading to the respective telephone, and on the other hand, each of the resistors $R_{II}$ is connected to a respective input of a common differential amplifier D2 and hence through this differential amplifier D2 to the exchange or central station Z.

The potential difference between the two terminals A1 and A2 leading to the telephone, controls a non-illustrated sensor. A conventional switching regulator SR is provided, through which the primary current to the telephone, is recognized by this sensor, which includes the two voltage dividers $R_I$ and $R_{II}$ and the differential amplifier D2. The secondary side of the transformer TR serves for driving the first-mentioned voltage divider S1, S2 as well as the current sources Q1 and Q2 leading to the two terminals A1 and A2 and to the sensor voltage dividers $R_I$ and $R_{II}$.

The connection between the control output of the switching regulator SR and the primary side of the transformer TR is established, for example, through a bipolar pnp-transistor T, which is operated in a common emitter circuit. To this end, the emitter of this transistor T may be connected to reference potential (ground) and the collector thereof may be connected through the primary winding of the transformer TR to a supply potential $-U_B$.

The secondary winding of the transformer TR addresses the aforementioned rectifier circuit G1. The rectifier circuit G1 may be formed of a diode D, which is coupled with one terminal of a capacitor C and is coupled through the secondary winding of the transformer TR to the other terminal of the capacitor C. In the embodiment shown, one output terminal of the secondary winding of the transformer TR is connected to the anode of the diode D, and the cathode of the diode is connected to one terminal of the capacitor C. This one terminal of the capacitor C leads to one terminal of the two voltage dividers S1 and S2, and it also leads to the current source Q1 and through the resistor $R_o$ to the terminal A1 which leads to the telephone. The other terminal of the capacitor C is connected to the base of the other current source Q2 and it is also connected through the resistor $R_o$ associated with the current source Q2 to the second terminal A2 leading to the peripheral telephone.

A path from the exchange, or central station, Z to the peripheral telephone, leads through two series connections each having a controlled voltage source (SPA, SP2) and respective resistors R2 of the two voltage dividers S1 and S2, to respective inputs of a common differential amplifier D1 having at least one output controlling at least one respective one of the above-mentioned current sources Q1 and Q2.

The two identical controlled voltage sources SP1 and SP2 are constructed in the usual manner (as described, for instance, in the publication by Tietzke-Schenk, entitled "Halbleiter-Schaltungstechnik" (Semiconductor circuitry) (1980), p. 239), with bases thereof being connected to reference potential and the other output terminals thereof each being connected to one end of a respective terminal of resistor R2 of the associated voltage divider S1, S2. The other terminal of resistors R1 of the voltage dividers S1, S2 are addressed by the cathode of the diode D shown in the embodiment, which forms the output of the rectifier circuit G1 on the secondary side of transformer TR. The taps of the identical voltage dividers S1 and S2 are each connected, as has been noted before, to a respective input of the differential amplifier D1.

The connection of the voice output of the exchange or central station Z supplying the signals intended for the peripheral telephone, in the direction toward the telephone, leads through an amplifier D3. One output of the amplifier D3 is provided for controlling the voltage source SP1, while the other output serves for controlling the voltage source SP2, and hence the amplifier drives the two identical voltage dividers S1 and S2. (In the second embodiment according to FIG. 2, the amplifier D3 is a differential amplifier. However, this is immaterial for the invention).

The differential amplifier D1 having two inputs which are each addressed by the tap of one of the two identical voltage dividers S1 and S2, also has two outputs. One of the outputs of the amplifier D1 is intended for controlling the current source Q1 and the other is intended for controlling the current source Q2, as can be seen from FIG. 1. The two current sources Q1 and Q2 are constructed in the conventional manner and may be formed by a transistor or by a current mirror. In accordance with the above-mentioned viewpoints, in the further development of the invention, there is provided a monolithic integration (e.g. in the semiconductor technology known as "Dielectric Isolation") of the two current sources Q1 and Q2 with the differential amplifier D1 controlling them, the resistors $R_o$ bridging them, the resistors R1 and R2 of the voltage dividers S1 and S2 and the two resistors $R_{II}$ of the second divider pair, to form a high-voltage component HV. If desired, the diode D and the transistor T (although the transistor T does not have a direct connection in terms of circuitry to the parts of the high-voltage component) may also belong to the combination. The remaining parts, i.e. the resistors $R_I$ of the additional voltage dividers, the controlled voltage sources SP1, SP2, the amplifiers D2 and D3, as well as the switching regulator SR, may in turn likewise be monolithically combined to form a low-voltage component. Only a few components will then still be external, such as the transformer TR and the capacitor C.

Figure 2:
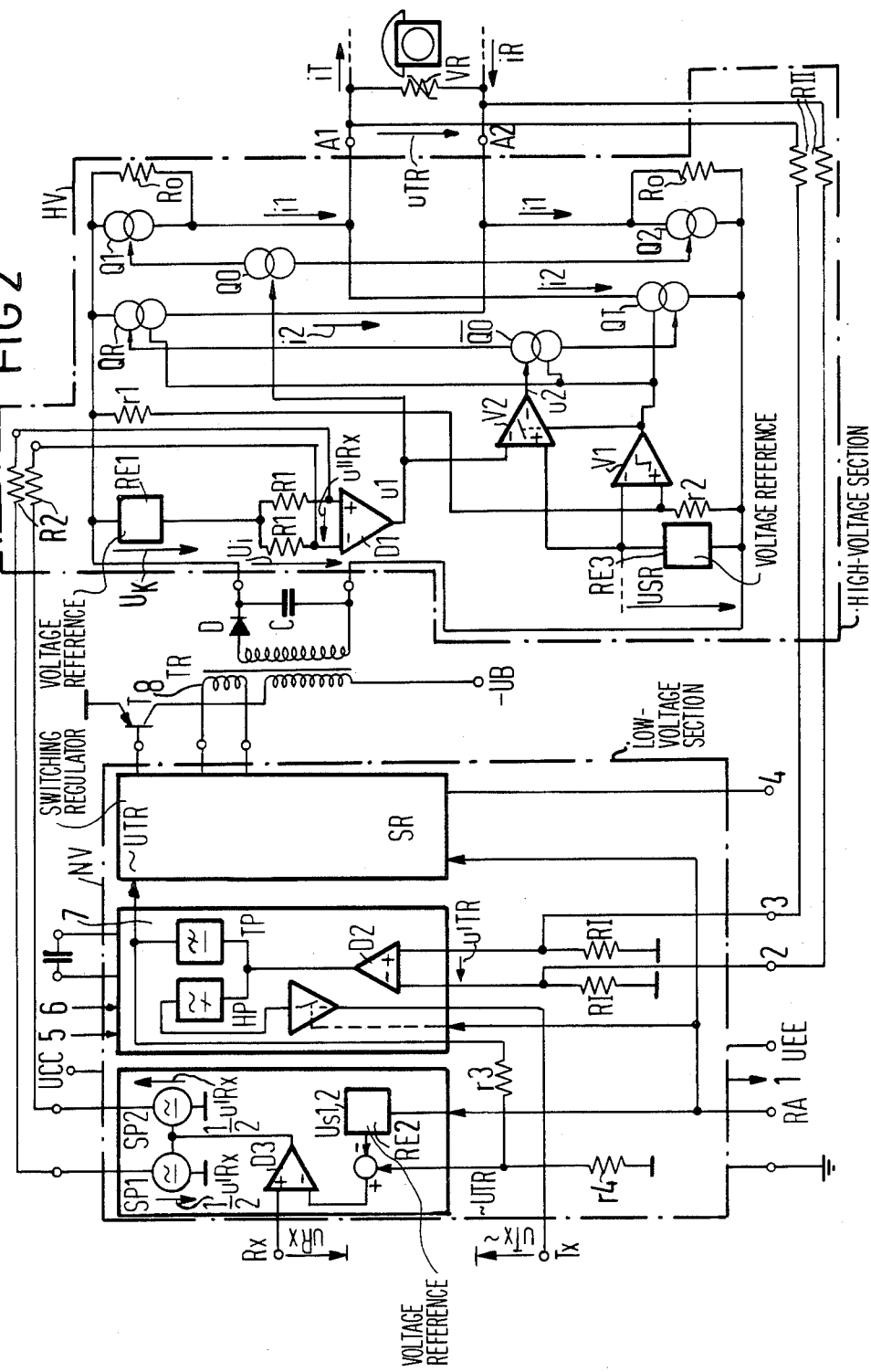
FIG. 2 is a detailed circuit diagram thereof.

FIG. 2 shows a further embodiment for illustrating further aspects of the invention. The principle of the embodiment of FIG. 2 has already been provided in simplified form in FIG. 1.

Since the subscriber line is only energized with a total current of varying polarity during the ringing process, controlled current sources Q1 and Q2 which are only capable of one current flow direction are provided, for reasons of economic efficiency. The varying polarity of the current during the ringing process is obtained by connecting-in additional current sources QR and QT. The switching-in of the current sources QR and QT takes place exclusively during the ringing process for reasons of power dissipation and is represented by the symbolic switches shown in the current sources of FIG. 2.

Figure 3:
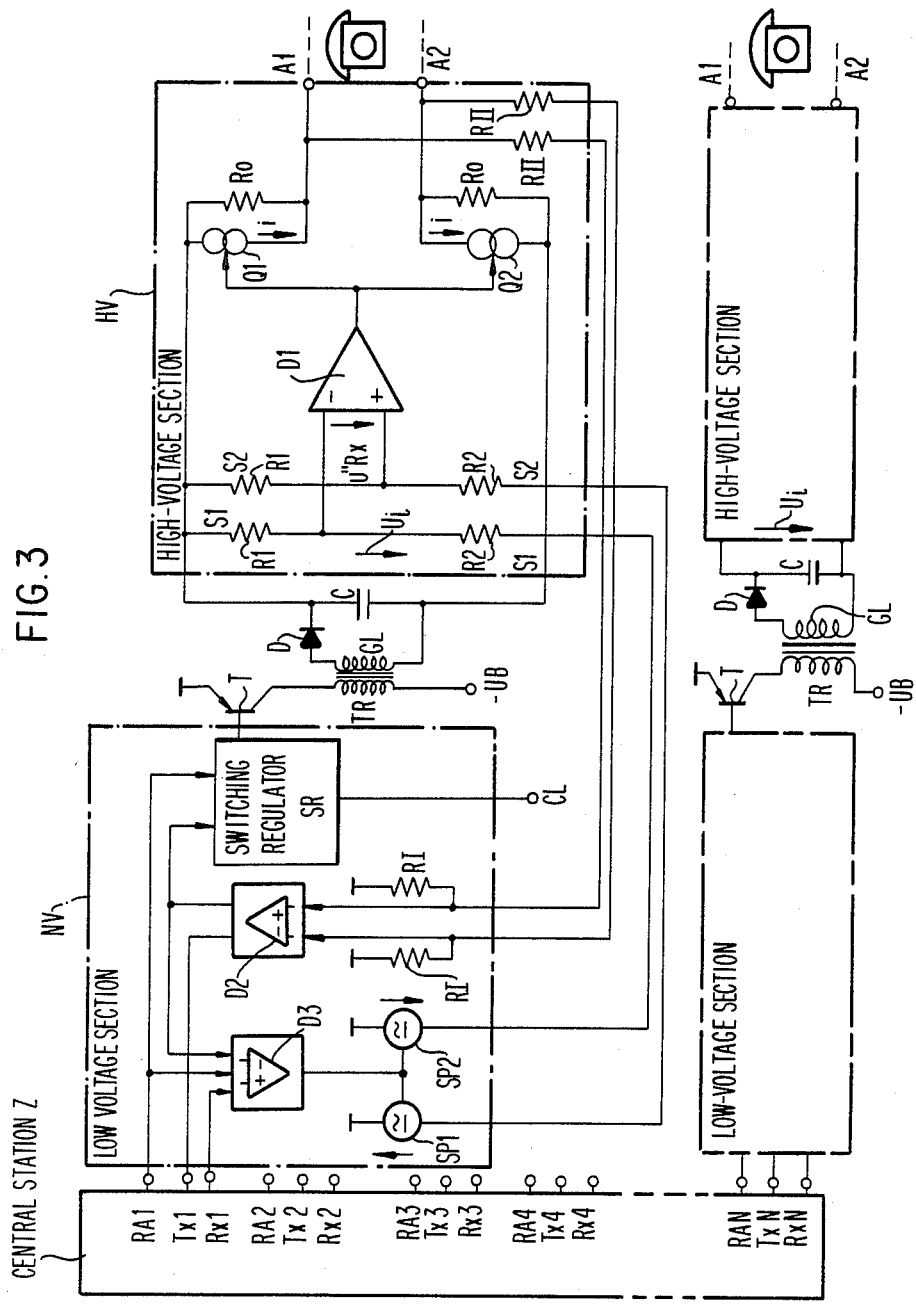
FIG. 3 is a more detailed circuit diagram of the telephone installation according to the invention.

Since considerably higher voltages must be applied to the subscriber lines during the ringing process than is the case during voice transmission, a much higher supply voltage $U_i$ of the high-voltage section HV is also required in this case. This is achieved by acting on the switching regulator SR upon a ringing request at terminal RA FIG. 3, so that, for instance, $U_i$ is equal to 70 V during voice transmission and is increased to $U_i$ is equal to 120 V during the ringing process. An increased internal supply voltage $U_i$ seen in FIG. 2 occuring only in the ringing process is recognized in the high-voltage section HV by a sensor (formed of a voltage divider $r_1$, $r_2$ and a comparator $V_1$). This recognition is made in comparison with a reference voltage USR of a reference unit RE3 and is used for activating the additional current sources QR and QT with a quiescent current also suitably selected by the reference voltage USR. This eliminates an additional d-c connection to the high-voltage section HV that would otherwise be necessary for control. The method of controlling the current sources Q1, Q2, QR, QT is in itself immaterial for the present invention and could be done, e.g., according to FIG. 1 or, as can be seen from FIG. 2, by additional auxiliary current sources QO and $\overline{QO}$.

The control loop of the switching regulator SR can be seen in FIG. 2. The voltage dividers, formed of the two resistors $R_I$ and the two resistors $R_{II}$, take off the line voltages of the subscriber lines at the terminals A1 and A2 leading to the peripheral telephone. A voltage U'TR at the input of the differential amplifier D2 is proportional to a voltage UTR between the terminals A1 and A2. The time average UTR thereof, taken off after a low-pass filter TP shown in FIG. 2 in a low-voltage section NV, is used for the control of the switching regulator SR, in such a way that $U_i$−uTR, being time-averaged, remains constant. In other words, the means value of the voltages across the current sources Q1, Q2 and possibly QR, QT is just great enough for their full operability. If necessary for the regulating activity, an additional sensor winding 8 may be provided on the transformer TR, through which the switching regulator SR then receives information about the resulting voltage $U_i$.

The voice signals present at the terminals A1, A2 can also be taken off at the output of the differential amplifier D2 and are delivered at an output Tx after removal of the d-c components by means of a high-pass filter HP, which is also provided in the low-voltage section NV.

The generation of the voice currents in the current sources Q1, Q2 and possibly the generation of the ringing a-c currents jointly with the current sources QR and QT, is controlled by an input terminal Rx through the differential amplifier D3, and the controlled voltage sources SP1, SP2, etc.

In addition, FIG. 2 includes a second control loop, which is operative in normal operation with respect to the d-c behavior of the terminals A1, A2 and ensures that the terminals A1, A2 act like a battery with a given open-circuit voltage and internal resistance with respect to a d-c connected load. The properties of this equivalent battery can be adjusted by selection of a reference voltage Us1 and by suitably setting the gain factors in the control loop, symbolized by resistors r3, r4 in FIG. 2. The quantity to be controlled, namely the d-c voltage value of the voltage UTR between the terminals A1, A2 leading to the peripheral telephone, is already processed for the control of the switching regulator SR (after merely by being proportionally altered) and is available at the output of the above-mentioned low-pass filter TP.

The control loop is closed by the resistors r3, r4, in order to indicate a possibly existing further proportional change. This is done with the inclusion of a reference unit RE2 through the inverting input of the differential amplifier D3 and it is thereafter superimposed on a signal generated by a voltage uRx at the input terminal Rx.

In the case of the ringing process, the reference unit RE2 is switched to a voltage Us2, if desired. If necessary, a dc voltage component of suitable magnitude can therefore be superimposed on the ringing ac voltage resulting at the terminals A1, A2.

Furthermore, a reference unit RE1 permits a dc asymmetry to be obtained by selection of a suitable voltage value $U_k$, so that for reasons of corrosion protection, the two-wire conductors A1, A2 are negative relative to ground.

With reference to FIG. 2, the following should additionally be noted:

(a) The switching regulator, e.g. a blocking converter SR contains a pulse width control for active operation, with $U_i$−UTR being constant, as indicated above.

(b) The terminal RA serves for a ring request.

(c) The DC/AC signal separation and the control of the switching regulator take place through a circuit section designated with reference numeral 7, which contains the two filters HP and TP as well as the differential amplifier D2 in the circuit embodiment shown in the drawing.

(d) Other functions of this circuit section are current limitation and selecting an active feeding characteristic.

(e) The voltage −UB at the primary winding of the transformer TR is, e.g., −42 to −58V.

(f) The previously mentioned sensor is a sensor winding 8 on the transformer TR, which can also be used for energy transmission during "Power Down."

(g) The switching regulator SR, e.g. a blocking converter, constructed in the conventional manner, is known to require a clock signal. If this is not generated internally, then an input 4 for a clock signal must be provided. This input may be driven with a clock frequency of 32 kHz.

(h) Voltages UCC and UEE are the supply potentials for the low-voltage component NV.

(i) The reference symbol 1 denotes an output for the loop indication; reference symbol 6 shows an input for the external adjustability of the current limitation; and reference symbol 5 is an input for selection of the active feeding characteristic in the low-voltage component NV. Potentials for testing purposes can be taken off at the terminals 2 and 3 of the low-voltage component NV.

It is also an essential advantage of the invention that without resorting to additional circuitry and the expense caused thereby, the disturbances due to longitudinal voltage can be mastered. In order to provide secondary protection against lightning effects, it is sufficient to connect the two-wire conductors, that is the two terminals A1, A2 leading to the peripheral telephone, by means of a varistor VR (shown in FIG. 2), which, as is known, can be provided at low cost. Upon the occurence of permanent shortcircuit with the power supply (220 V), it is assured that at most the high-voltage component HV may be affected or even destroyed, but not any additional circuit parts of the exchange or central station Z.

The number of high-resistance dc connections to the telephone installation according to the invention is limited to four. The advantage over the conventional installation is that a small, simple transformer is sufficient, yet the information concerning the dc voltage conditions of the two-wire conductors, that is, of the two terminals A1 and A2, is available for testing purposes in the switching system of the exchange or central station Z. Further functions, such as balancing (hybrid) and ac impedance, can be achieved with additional integrated components for telephone engineering.

The foregoing is a description corresponding in substance to German Application P No. 32 37 652.9, dated Oct. 11, 1982, the International priority of which is being claimed for the instant application, and which is hereby made part of this application. Any material discrepancies between the foregoing specification and the aforementioned corresponding German application are to be resolved in favor of the latter.

I claim:

1. Circuit arrangement for a telephone system disposed between a telephone exchange and a telephone instrument, the circuit arrangement being connected to the telephone instrument via two telephone wires; and comprising: current feed means for providing current feed for the telephone instrument; an integrated low-voltage circuit section; a high-voltage circuit section connected to said telephone instrument; a switching regulator included in the low-voltage section controllingly engaging the high-voltage section, a transformer having a primary winding connected to said switching regulator and a secondary winding connected to the high-voltage section for providing galvanic isolation between the switching regulator and the high-voltage section, and a first and a second pair of high-resistivity voltage dividers for providing two-way galvanic control signalling between said low-voltage section and said high voltage section.

2. Circuit arrangement according to claim 1, including two resistors of equal resistivity, two connecting wire terminals, each being connected to one end of a respective one of said resistors, and to a respective one of said two telephone wires, two controllable current feed sources, each connected in parallel with a respective one of said two resistors, the other end of said resistors being connected to a respective end of the secondary winding of said transformer, and first and second controllable ringing current sources each having first and second control inputs, a current input and a current output, the first ringing current source being connected at its current input to one end of said secondary winding and at the current output to one of said wire terminals, the second ringing current source being connected at its current output to the other end of the secondary winding and at its current input to the other wire terminal, and wherein said controllable ringing current sources are supplied with voltage from two controllable voltage sources via the second pair of high resistivity voltage dividers; the two ringing current sources are controlled by a sensor having two inputs connected to the respective ends of the secondary winding of said transformer, the sensor including a further voltage divider having a divider output connected to the respective first control inputs of said ringing current sources for disconnecting ringing in response to an off-hook condition of said telephone instrument.

3. Circuit arrangement according to claim 2, wherein said controllable voltage sources are controlled from the exchange, and generate inverted voltages referenced to ground potential; said second pair of voltage dividers are connected respectively to each of said voltage sources at one side and are at the other side connected jointly to a given end of said transformer secondary winding, said second pair of voltage dividers each have a divided voltage output including a first differential amplifier having two inputs respectively connected to the divided voltage output of said second pair of voltage dividers; and the output of said first differential amplifier being connected to the second control input of a respective one of said ringing current sources via a second differential amplifier.

4. Circuit arrangement according to claim 3, wherein said second pair of voltage dividers has two jointly connected ends; including a first reference voltage connected at one side to said jointly connected ends and at the other side to said given end terminal of said transformer secondary winding.

5. Circuit arrangement according to claim 1, wherein said current feed means include two resistors of equal resistivity each forming a parallel connection with a respective current feed source, each of said parallel connections is connected at one side to a respective one end of said transformer secondary winding and on another side to a respective one of said line terminals connected to said telephone instrument.

6. Circuit arrangement according to claim 2, including first, second and third differential amplifiers, wherein said first pair of voltage dividers includes at one side two resistors each connected to ground potential at one end and at the other side two resistors connected at one end to a respective one of said wire terminals, each voltage divider has a dividing point; the second differential amplifier has two inputs, each connected to a respective one of said dividing points of the first voltage dividers, and an output connected to an input of said switching regulator, and each of said controllable voltage sources is connected to an input of said first differential amplifier.

7. Circuit arrangement according to claim 6, including a low-pass filter connected at one side to the output of said second differential amplifier, and at the other side to an input to said switching regulator, a comparator having an input connected to said other side of said low-pass filter and an output; the third differential amplifier having an input connected to said comparator output, said third differential amplifier having a second input controlled by an output from said exchange and an output connected to the inputs of said controlled voltage sources, and wherein said second differential amplifier is further connected at its output to a high-pass filter connected to an input to said exchange.

8. Circuit arrangement according to claim 1, wherein said switching regulator includes a ringing request input for receiving a ringing request signal from said exchange, and a control output connected to a common emitter coupled transistor circuit connected at its output to the primary winding of said transformer.

9. Circuit arrangement according to claim 8, including a switchable reference voltage source having an input, wherein said ringing request input to said switching regulator is commonly connected to a voltage reference input and to said voltage source input.

10. Circuit arrangement according to claim 1, wherein the secondary winding of said transformer is connected to a rectifier for producing at its output side a two-terminal output dc-voltage.

11. Circuit arrangement according to claim 1, wherein said transformer includes a sensing winding connected to a feedback input of said switching regulator.

12. Circuit arrangement according to claim 2, wherein said current feed sources, said resistors of equal resistivity, said ringing current sources, said sensor and said first and second pair of voltage dividers are combined into a monolithically integrated circuit forming a high-voltage section of the circuit arrangement.

13. Circuit arrangement according to claim 7 wherein said second and third differential amplifier, said low-pass and high-pass filters and said comparator circuit are combined into a monolithically integrated circuit forming a low-voltage section of the circuit arrangement.

* * * * *